United States Patent [19]

Beccaris et al.

[11] Patent Number: 5,127,499
[45] Date of Patent: Jul. 7, 1992

[54] CLUTCH HAVING A PRESSURE PLATE ASSOCIATED WITH AN INTERMEDIATE DISC

[75] Inventors: Carlo Beccaris, Santena, Italy; Jacques T. de Briel, Levallois Perret, France

[73] Assignee: Valeo, Paris, France

[21] Appl. No.: 709,027

[22] Filed: May 31, 1991

[30] Foreign Application Priority Data

May 31, 1990 [FR] France ................... 90 06764
Nov. 28, 1990 [FR] France ................... 90 14870

[51] Int. Cl.⁵ ............................................. F16D 13/50
[52] U.S. Cl. ................... 192/70.27; 192/70.19; 192/89 B
[58] Field of Search ............... 192/70.27, 70.11, 89 B, 192/70.19

[56] References Cited

U.S. PATENT DOCUMENTS

| | | | |
|---|---|---|---|
| 1,016,427 | 2/1912 | Morse | 192/70.25 X |
| 1,665,999 | 4/1928 | Byerlein | 192/70.25 X |
| 2,190,874 | 2/1940 | Jarrett | 192/113 |
| 3,236,347 | 2/1966 | Puls et al. | 192/70.27 |
| 4,236,620 | 12/1980 | Beccaris | 192/70.27 X |
| 4,368,810 | 1/1983 | Maucher et al. | 192/70.25 X |

FOREIGN PATENT DOCUMENTS

| | | | |
|---|---|---|---|
| 2155123 | 5/1972 | Fed. Rep. of Germany . | |
| 2623862 | 6/1989 | France . | |
| 60-188628 | 9/1985 | Japan | 192/70.25 |
| 752516 | 7/1956 | United Kingdom . | |

*Primary Examiner*—Leslie A. Braun
*Assistant Examiner*—Andrea Pitts
*Attorney, Agent, or Firm*—Longacre & White

[57] ABSTRACT

A clutch includes a reaction plate, a cover plate, a pressure plate and, arranged between the pressure and reaction plates, at least one friction disc. At least one intermediate disc is also provided, being arranged to come into contact with the pressure plate. The pressure plate and the adjacent intermediate disc associated with the pressure plate are secured together by a resilient gripping action, which is exerted by axial gripping members arranged between the pressure plate and the intermediate plate.

13 Claims, 7 Drawing Sheets

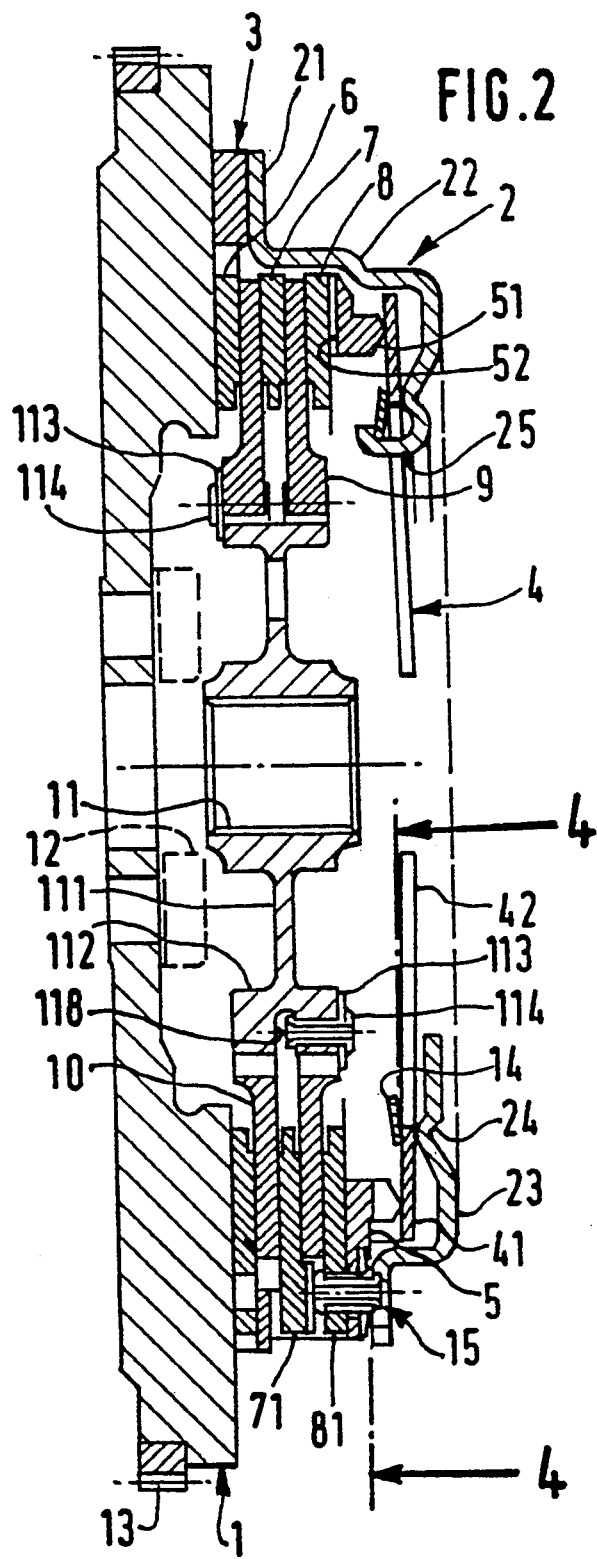
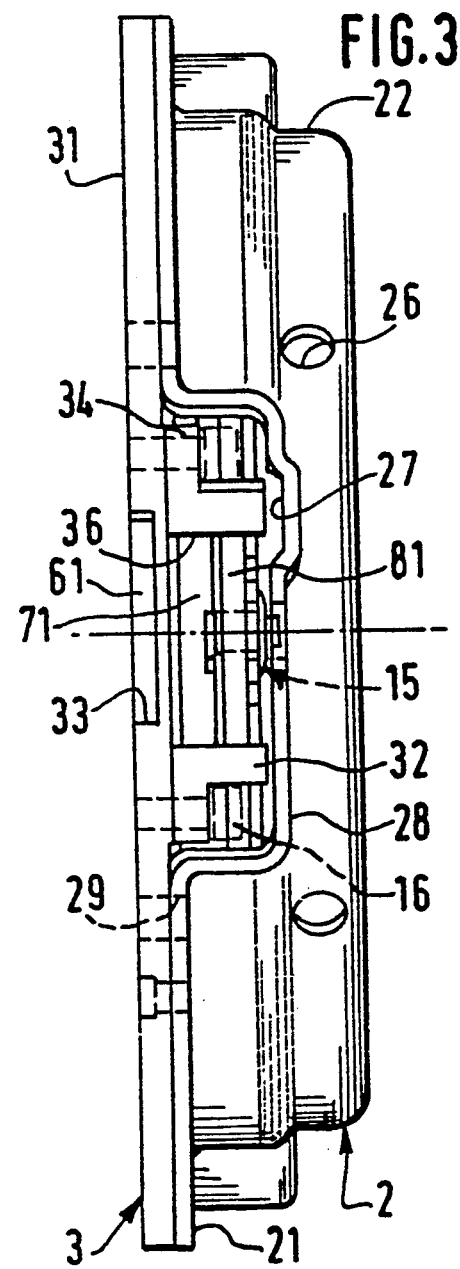
FIG.2
FIG.3

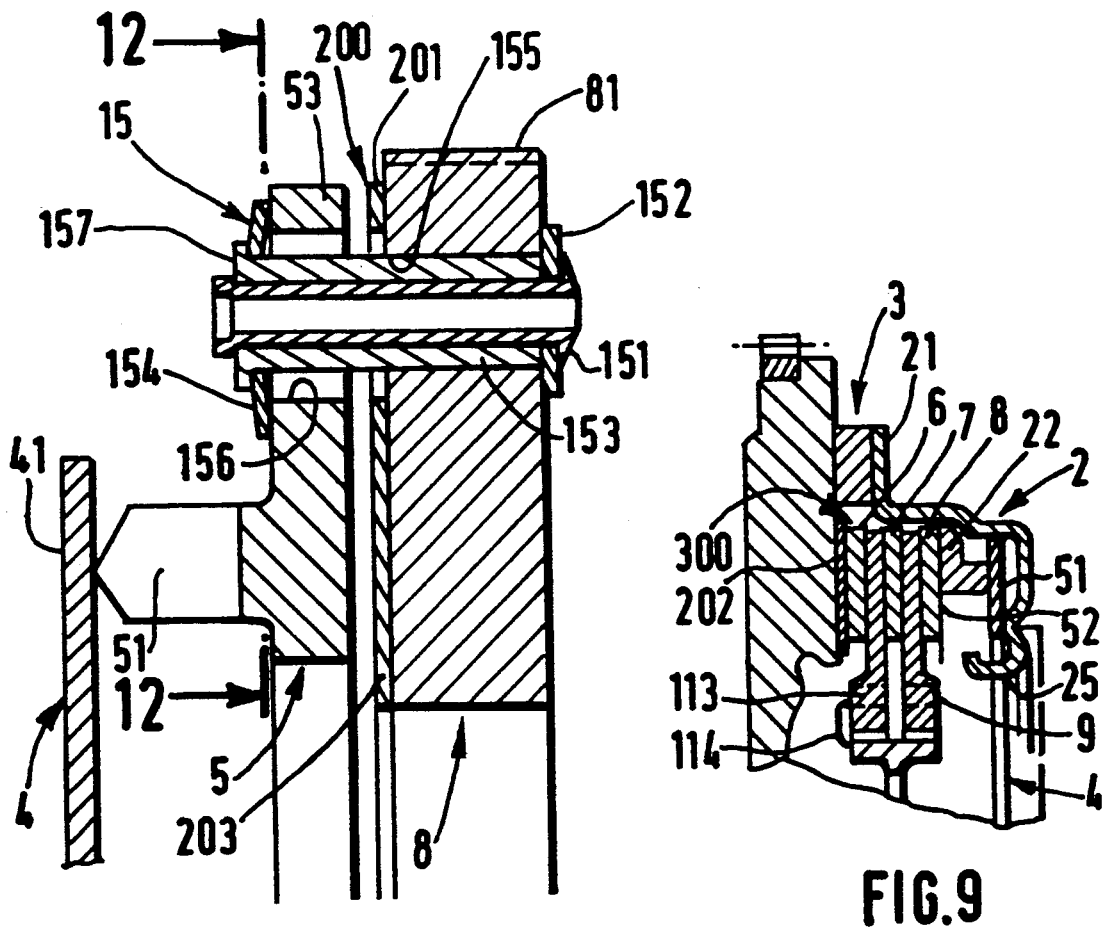
FIG. 11
FIG. 9
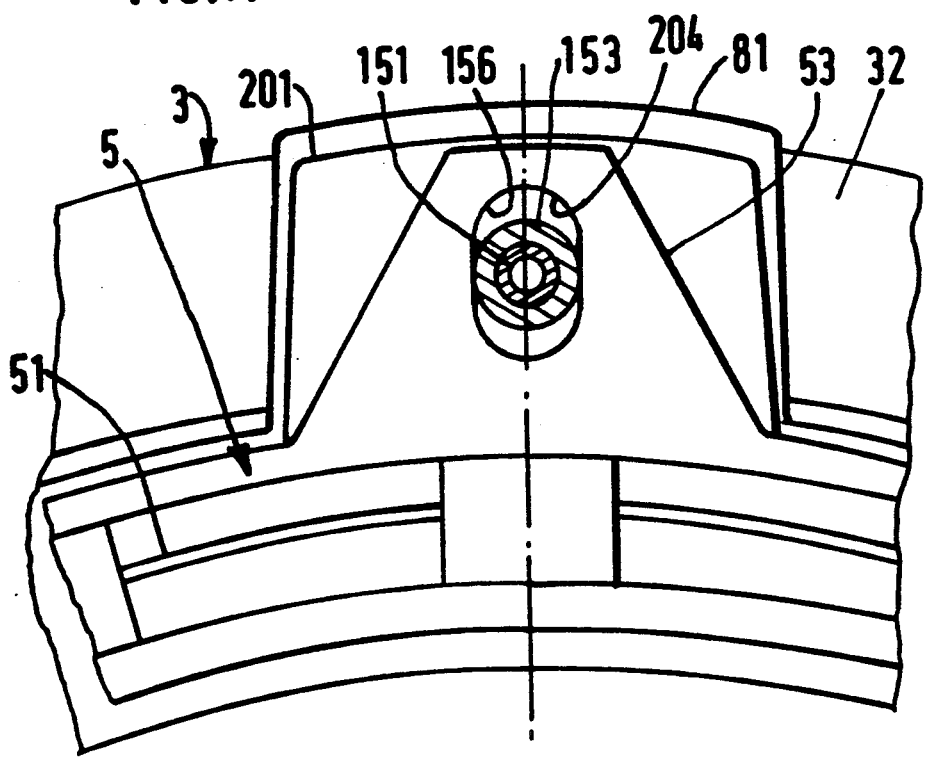
FIG. 12

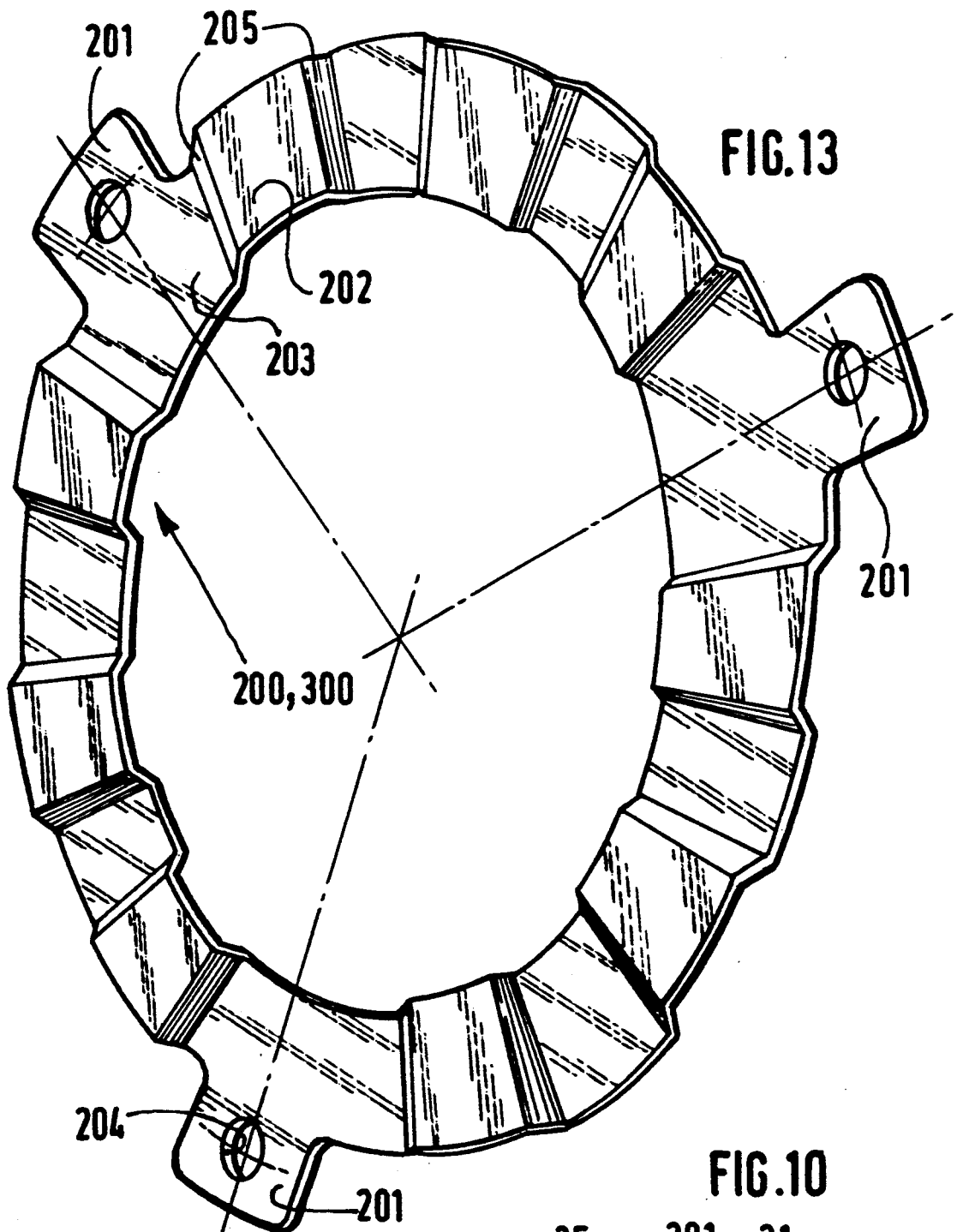

CLUTCH HAVING A PRESSURE PLATE ASSOCIATED WITH AN INTERMEDIATE DISC

FIELD OF THE INVENTION

This invention relates to clutches of the kind having a plurality of friction discs, especially for motor vehicles. More particularly, the field of the invention is that of clutches of the above kind comprising: a reaction plate; a cover plate which is secured to the reaction plate; a pressure plate which is fixed with respect to the cover plate to the extent that it rotates with the latter, but which is mounted for axial movement with respect to the cover plate; and, arranged between the pressure plate and the reaction plate, firstly at least one friction disc mounted for rotation with a hub, and secondly at least one intermediate disc which is mounted for rotation with the reaction plate and the cover plate, with the intermediate disc, or one of the intermediate discs if there is more than one, being adjacent to the pressure plate.

BACKGROUND OF THE INVENTION

A clutch of the above kind is described in the specification of French published patent application FR No. 2 623 862A. In that specification, the intermediate discs are coupled with the reaction plate for rotation with the latter, the intermediate discs being movable axially by virtue of a plurality of intermediate driving members in the form of spacing blocks.

Such an arrangement enables a cover plate of a standard type to be used. However, the intermediate disc which lies adjacent to the pressure plate is not located against axial movement with respect to the pressure plate. At the instant when the clutch is disengaged during a declutching operation, and during the withdrawal or retraction of the pressure plate, this results in a loss of travel for the friction disc or discs, with the latter not becoming spaced apart by a sufficiently large distance from the intermediate discs.

DISCUSSION OF THE INVENTION

An object of the present invention is to overcome the above drawbacks, and to provide a clutch arrangement in which the intermediate disc adjacent to the pressure plate has a sufficiently large degree of displacement, while also giving other advantages.

In accordance with the invention, a clutch of the kind having a plurality of friction discs, comprising: a reaction plate; a cover plate secured to the reaction plate; a pressure plate which is mounted for rotation with the cover plate and for axial movement with respect to the latter; at least one friction disc which is mounted between the pressure plate and the reaction plate and which is also mounted on a hub for rotation with the latter; at least one intermediate disc, disposed between the pressure plate and the reaction plate and mounted for rotation with the reaction plate and the cover plate while being movable axially with respect to the pressure plate and reaction plate, the said intermediate disc (or one of them if more than one is provided) being in contact with the pressure plate, is characterised in that axial securing means are arranged between the pressure plate and its associated intermediate plate, so as to grip the said pressure plate and intermediate plate resiliently.

In a clutch according to the invention, during the declutching operation the intermediate disc adjacent to the pressure plate follows the movement of the latter in such a way that the friction disc or discs are able to be displaced by a satisfactory amount. In addition, the number of components to be assembled together is reduced, with the pressure plate constituting, with its associated intermediate disc, a sub-assembly which is readily able to be handled and transported.

In addition, the resilient gripping action mentioned above enables the clutch to reach high temperatures without this giving rise to any problem. It also enables the pressure plate and its associated intermediate disc to be made in different materials. For example, the pressure plate may be of aluminum, while the intermediate disc is of a carbon based material.

In practice, it therefore becomes possible to accommodate thermal expansion and contraction which arises due to the difference in temperature between the intermediate disc and the pressure plate, while also providing a clutch the components of which have low inertia.

In accordance with a feature of the invention, the said axial securing means are arranged for centering the pressure plate in such a way that the latter is able to be movable axially while being coupled in rotation to the cover plate and to the reaction plate and also being centered. The pressure plate is thus coaxially suspended on its intermediate disc.

All of the above configurations are of advantage when the intermediate disc is driven by an intermediate driving member which couples it in rotation with axial mobility, to the cover plate and to the reaction plate. In that case, the intermediate member need not be elongated, since it drives the pressure plate in rotation through its intermediate disc.

In accordance with a feature of the invention which is especially preferred, the said securing means include at least one securing device having at least one axially acting resilient means and passing through the pressure plate via an oblong hole formed in the latter, the said hole being radially oriented. This arrangement minimizes any danger of deterioration of the intermediate disc, since the latter can easily expand or contract radially and axially with respect to its pressure plate.

The intermediate driving member is preferably so designed as to have axial retaining means for an intermediate disc adjacent to the reaction plate. This produces a satisfactory degree of displacement for the friction discs.

All of the above arrangements enable resilient means, of the kind that exert a progressive axial force, to be mounted between the pressure plate and its associated intermediate disc, and also between the reaction plate and its associated intermediate disc. This progressive axial force results in improved comfort to the occupants of the vehicle.

The description which follows illustrates the invention in detail, by way of example only and with reference to the accompanying drawings.

BRIEF DESCRIPTION OF THE DRAWINGS

FIG. 2 is a view in cross section taken on the line 2—2 in FIG. 1.

FIG. 3 is a view as seen in the direction of the arrow 3 in FIG. 1.

FIG. 9 is a partial view similar to FIG. 2, but showing a modification having resilient rings for exerting a progressive axial thrust.

FIGS. 10 to 12 are views similar to FIGS. 5 to 8 respectively, but showing the modified embodiment seen in FIG. 9.

FIG. 13 is a perspective view of the progressive thrust ring itself.

DESCRIPTION OF PREFERRED EMBODIMENTS OF THE INVENTION

Figure 1:
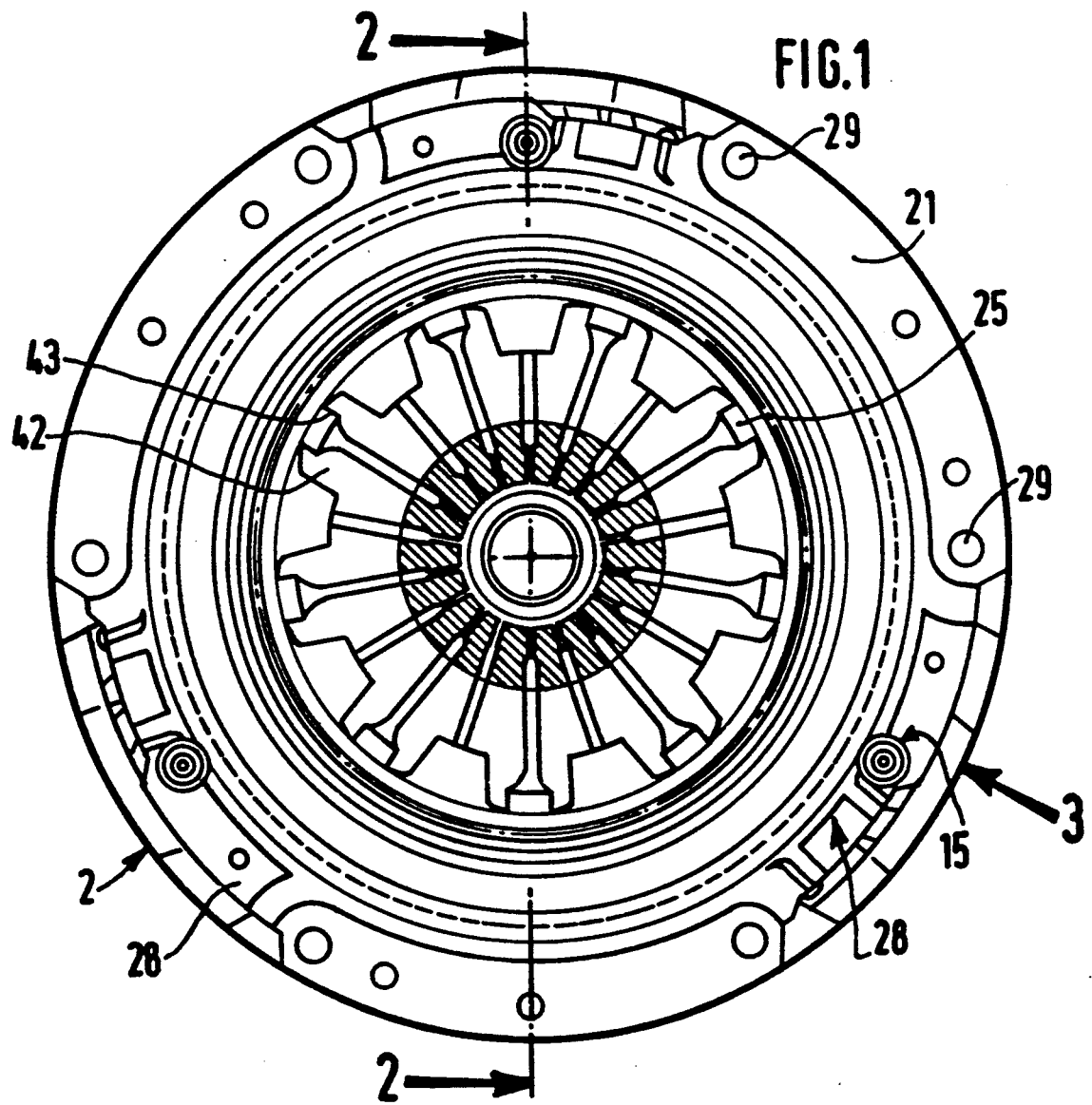
FIG. 1 is a view in elevation of the clutch in accordance with the invention.

The clutch which will be described below is a clutch of the kind having two friction discs, particularly suitable for fast motor vehicles such as sports or racing cars. It comprises a plurality of annular members, all coaxial with each other, namely a reaction plate 1, a cover plate 2, an intermediate crown 3, a diaphragm 4, intermediate discs 6, 7 and 8, friction discs 9 and 10, and a hub 11. The reaction plate 1 is also the engine flywheel, and is fastened to the crankshaft (not shown) of the engine of the vehicle, in this particular example by means of bolts or studs 12 which are shown diagrammatically.

The cover plate 2 is generally in the form of a hollow dish, and has an outwardly projecting radial fastening flange 21 which is joined to an annular skirt portion 22 oriented axially. The skirt portion 22 is joined to a base portion 23 which extends generally radially and towards the axis of the assembly. The base portion 23 has a projecting bead 24, and is also provided with assembly tabs 25. It has a central opening. The bead 24 acts as a primary stop element for the diaphragm 4. More precisely, the diaphragm 4 has a peripheral portion 41 defining a Belleville ring, and a central portion which is divided into radial fingers 42 separated by gaps (see FIG. 1), together with apertures 43 adjacent to the roots of the fingers 42, with the gaps between the fingers opening into the apertures 43.

The Belleville ring 41 bears internally on the annular bead 24, while externally the ring 41 bears on an annular lip 51 of the pressure plate 5. In this example, the annular lip 51 is divided into separate sections. The assembly tabs 25 extend through the apertures 43 of the diaphragm, being then bent radially outwards in the direction away from the axis of the assembly, so that they are hook-shaped. The purpose of the tabs 25 is to locate in position a sealing ring 14. This ring 14 constitutes a secondary engagement element for the Belleville ring 41, facing the bead 24.

In this way, the diaphragm 4 is mounted for tilting movement on the cover plate 2, and bears on the latter so as to urge the pressure plate 5 towards the reaction plate 1, thereby enabling the discs 6 to 10 to be gripped. More precisely, the intermediate disc 6, the friction disc 10, the intermediate disc 7, the friction disc 9, and the intermediate disc 8 are interposed in axial succession, in the order mentioned, between the reaction plate 1 and the pressure plate 5.

The discs 6, 7 and 8, which in this example are driving discs, are secured to the reaction plate 1 and the cover plate 2, for rotation with them, through the crown 3 which thus acts as an intermediate drive member. The discs 9 and 10, which in this example are driven discs, being arranged alternately with the intermediate discs 6, 7 and 8, are mounted so as to be rotatable with the hub 11 while being movable axially. They are surrounded by the skirt portion 22 of the cover plate 2, by the discs 7 and 8, and by the pressure plate 5.

The crown 3 has means for coupling it in rotation, so as to drive the intermediate discs 7 and 8 while preserving their ability to move in the axial direction. In this example, this rotary coupling means consists of a plurality of axial lugs 32, fixed to the crown 3 (see FIGS. 3 and 6). Each lug 32 defines a mortice 36. The lugs 32 extend axially towards the base portion 23 of the cover plate, the mortices 36 being open towards the base portion and closed by a ring 31 of the crown 3. A plurality of tenons 71, 81 are arranged to cooperate with the mortices 36. These tenons 71 and 81 are carried by, and project radially from, the respective intermediate discs 7 and 8, see FIG. 6.

The lugs 32 are fixed to the closure ring 31 (and in this example they are integral with it). The ring 31 is inserted axially between the reaction plate 1 and the fastening flange 21 of the cover plate 2. The outer diameter of the closure ring 31 is, in this example, equal to the outer diameter of the fastening flange 21 of the cover plate 2. In this example, the lugs 32 are made integral with the closure ring 31, being formed simultaneously with it by moulding or casting.

In a modification, the lugs 32 may be separate elements mounted on the closure ring 31, for example by welding, or by the use of screws or any other suitable type of fastener.

Referring to FIG. 3, the cover plate 2 is of a standard type, with its skirt portion 22 being provided with openings 27, each of which is delimited by a radial hood portion 28. The hood portion 28 is joined to the fastening flange 21, and would normally serve for securing tangential tongues which couple the pressure plate to the cover plate for rotation with it. In the present case, however, use is made of the opening 27 for insertion of the axial lugs 32, these lugs being designed and dimensioned accordingly.

Figure 5:
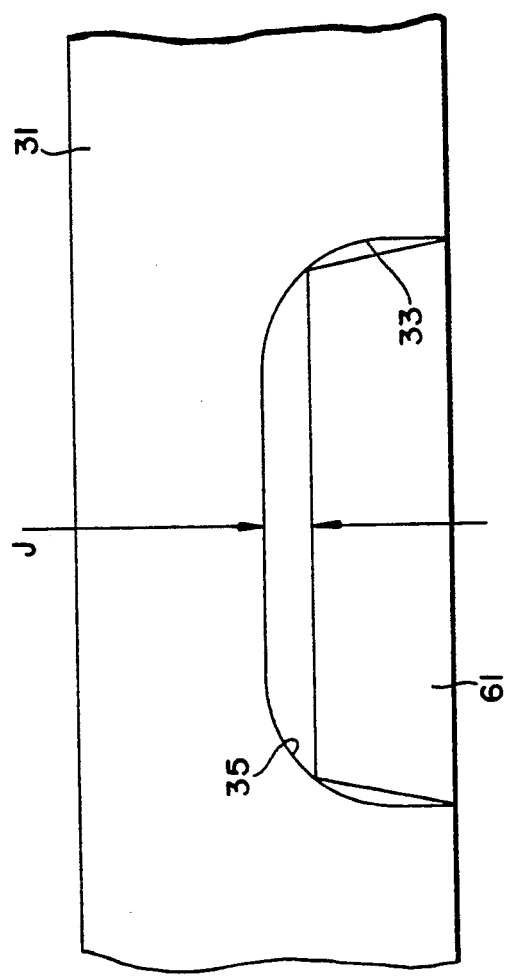
FIG. 5 is a detail view showing the form of the notch formed in the intermediate crown on the clutch.

The intermediate driving member or crown 3 has at least one thrust surface 35 (see FIGS. 5 and 6) which faces towards the reaction plate 1, while the intermediate disc 6 adjacent to the reaction plate 1 has a cooperating reaction surface 61, which engages the thrust surface 35 so as to locate the intermediate disc 6 axially with respect to the reaction plate 1. In this example, the intermediate disc 6 has at least one reaction surface 61 which cooperates with a notch 33 formed in the closure ring 31, on the side of the latter which faces axially towards the reaction plate 1. The thrust surface 35 is formed in the notch 33 itself, while the reaction surface 61 is formed on a projecting tenon of the intermediate disc 6.

It will be noted that in this example, each intermediate disc has three tenons which are spaced apart circumferentially at 120° with respect to each other. It will also be noted that the cover plate 2 has three hood portions 28 and three openings 27. The crown 3 has three axial lugs 32, three mortices 36, and three notches 33.

The outer diameter of the discs 6 to 10 determines the internal diameter of the closure ring 31 and of the lugs 32, according to requirements, but in such a way that, in particular, the discs 7 to 10 are able to penetrate within the circular envelope defined by the lugs 32, while the intermediate disc 6 can penetrate into the interior of the closure ring 31.

In this example the closure ring 31 is of metal. The notches 33 may be formed by a milling operation, and may extend through the whole radial height of the closure ring 31. The shape of the notches 33 depends on that of the tenons of the intermediate disc 6.

The number of tenons 81, mortices 36, notches 33 and hood portions 28 depends on the requirements of the application to which the clutch is to be put, and on the size of the cover plate 2. The same is true of securing means indicated at 15 in FIGS. 3 and 4. There may however be more than three of each of these elements. It is even possible to differentiate between the intermediate disc 6 on the one hand and the other discs 7 and 8 on the other hand, by providing a number of notches 33 that is different from the number of mortices 36. The tenons of the discs 6, 7 and 8 overlap the notches 33 and mortices 36 radially in this example. The notches 33 are here arranged at the level of (i.e. in circumferential alignment with) the lugs 32, which have two lateral shouldered portions 34 to support the heads of screws 16 securing the crown 3 to the reaction plate 1. The mechanical strength of the crown 3 is thus able to be made satisfactory despite the presence of the notches 33. In addition, because of the screws 16 and notches 33, it is possible to build a sub-assembly consisting of the crown 3, the intermediate disc 6 and the reaction plate 1, thus enabling the intermediate disc 6 to be inspected.

The cover plate 2 is also secured to the reaction plate 1 by means of screws (not shown), which extend through holes 29 in the fastening flange 21 of the cover plate, and through corresponding hole formed in the closure ring 31 (see FIG. 3).

The notch 33 has a base portion which is joined through rounded portions 35 to two axially disposed side flanks of the notch, and is generally U-shaped. The projecting tenon 61 has a circumferential width, subject to fitting clearances, equal to the distance separating the side flanks of the notch 33. Its thickness is less than the depth of the notch 33, so that a clearance J (FIG. 5) exists between the base of the notch 33 and the tenon 61 with its inclined flanks. The edges of the tenon 61 constitute stop or reaction surfaces and are inclined at sharp angles. They are designed so as to cooperate with the rounded portions constituting the actual working part of the latter.

The face of the intermediate disc 6 and the face of the intermediate crown 3 that face towards the reaction plate 1 lie in the same plane. Thus, during assembly by tightening the screws 16 into the reaction plate 1, the crown 3 is offered up to the reaction plate 1 so that the tenon 61 comes to bear on the rounded stop surfaces 35. In this way, the intermediate disc 6 is located axially without any play, but with coupling in rotation.

Since the clutch is intended for use in a fast motor vehicle such as a racing or sports car, the intermediate discs 6, 7 and 8 in this example contain carbon as do the friction discs 9 and 10. The latter are coupled to the hub 11 through teeth 91 and 101 (see FIGS. 6 and 4), which engage in complementary axial grooves 117 formed in the hub 11.

The hub 11 has an integral central portion with a splined internal bore, for mounting it on the input shaft (not shown) of the gearbox of the vehicle, for rotation with the input shaft. This central portion carries a radial web 111, which itself carries a fork 112 having two branches spaced apart from each other and extending radially outwards. The branches of the fork 112 are separated by a groove or gap 118. The width of each branch of the fork is greater than the thickness of the thickened inner periphery of the friction disc 10 or 9 concerned. The branches of the fork 112 are provided with grooves 117, with which the teeth 91 and 101 of the friction discs 9 and 10 respectively are arranged to cooperate. In order to facilitate machining, the grooves 117 are aligned axially from one branch of the fork to the other. Machining is then carried out by axial traverse of the fork 112.

It will be noted that in this example, the teeth 91 and 101 are trapezoidal in shape, and that the grooves 117 are of the same shape. The grooves 117 are bounded by projections 116 (which are here radial), while the teeth 91 and 101 are bounded respectively by recesses 92 and 102.

Each of four of the projections 116 accomodates one of four rivets 114, for which purpose they have apertures through which the rivets 114 can pass. The head of each rivet 114 bears on the surface of the branch that faces towards the other branch of the fork. The rivet head thus lies in the groove 118. Besides accommodating the rivet heads, the groove 118 also enables the inertia of the hub 11 to be reduced. The rivets 114 are hollow, and extend through the corresponding branch of the fork 112. The other end of each rivet is upset so as to retain a ring 113 in contact with the corresponding axial end face of the fork 112.

In this instance, each branch of the fork 112 is provided with two of the rings 113 and two rivets 114. The rings 113 define shoulders which are adapted to cooperate respectively with the disc 9 and the disc 10. In a modification, the rings 113 may be carried by bolts extending through the fork 112.

Due to the above arrangement, the hub 11 is located axially by the friction discs 9 and 10, so that during the assembly operation, while the input shaft of the gearbox is being inserted in the hub, there is no danger of the hub being ejected.

In addition, the rings 113 enable the movement of the friction discs 9 and 10 to be limited during a declutching operation. This enables the discs 9 and 10 to be displaced by a satisfactory amount. Furthermore, it also enables a sub-assembly, readily able to be handled and transported, to be built. This sub-assembly comprises the friction disc 9, 10 and the intermediate disc 7. All of this simplifies the clutch assembly operation.

Figure 4:
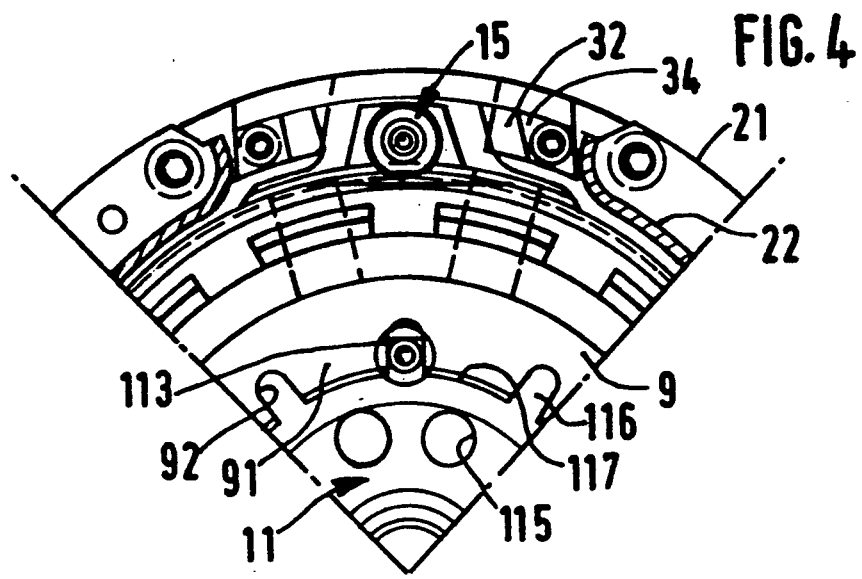
FIG. 4 is a view in cross section, showing part of the clutch, the cross section being taken on the line 4—4 in FIG. 2.

The securing means 15, mentioned and seen in FIGS 3 and 4, comprise axial securing means having a resilient gripping action, and are mounted between the pressure plate 5 and its associated intermediate disc 8. These axial securing means comprise, in this example, at least one axial fastening device 15 inserted in a hood portion 28. The intermediate disc 8 adjacent to the pressure plate 5 is joined to the latter through at least one of these fastening devices 15. It is the fastening devices 15 themselves that exert the appropriate resilient gripping force. They are fitted in respective tenons 81 of the intermediate disc 8. One fastening device 15 is associated with each tenon 81, as can be seen in FIG. 1. The number of the fastening devices 15 can of course, if desired, be smaller than the number of tenons 81.

Figure 7:
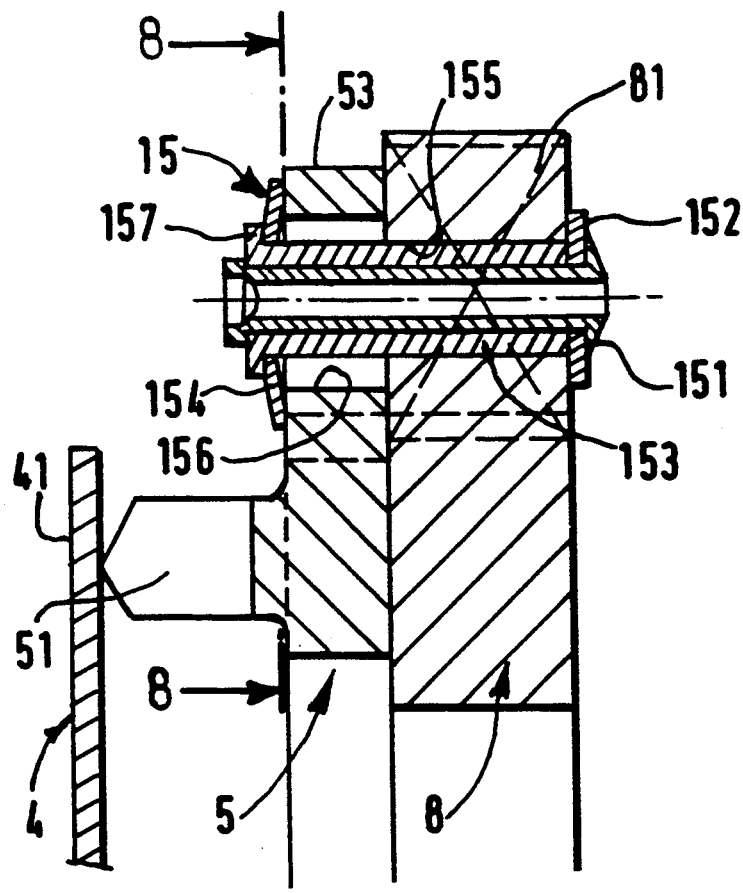
FIG. 7 is a view in cross section showing the securing means whereby the pressure plate is attached to its associated intermediate disc.
Figure 8:
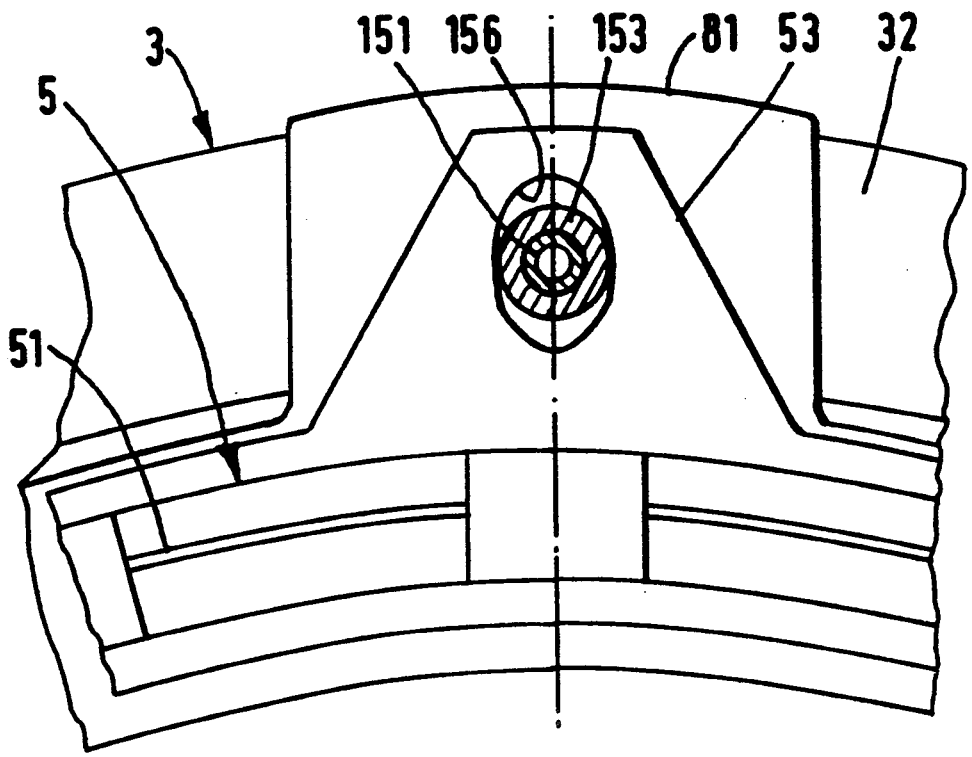
FIG. 8 is a partial view, seen in cross section on the line 8—8 in FIG. 7, with the intermediate crown included.

Referring to FIGS. 7 and 8, in this example the pressure plate 5 has three ears 53, trapezoidal in shape and projecting radially outwardly from the outer periphery of the pressure plate. These ears 53 lie in line with the corresponding tenons 81 of the intermediate disc 8, as can be seen best in FIG. 8. In this example there are three fastening devices 15 (FIG. 1) and three ears 53. The fastening devices 15 are spaced apart circumferentially at regular intervalsk, each in association with a respective one of the hood portions 28.

As in best seen in FIGS. 7 and 8, each of the three fastening devices 15 comprises a ring 152 and a tubular rivet 151, which passes through a centering and spacing tube 153 having a shoulder 157 at one of its ends. The tube 153 and the rivet 151 pass through an opening 155 which is formed in the tenon 81, and a hole 156 which is formed through the ear 53. The fastening device 15 also includes an axially acting resilient means 154, which in this example is a Belleville ring. The latter bears, firstly on the face of the ear 53 which is directed towards the diaphragm 4 (and therefore towards the base portion 23 of the cover plate 2), and secondly on the shoulder 157 of the tube 153.

Instead of th Belleville ring 154, this resilient means could instead consist of a coil spring or a corrugated ring, for example of figure-of-eight form.

The other end of the tube 153 is in contact with the ring 152, bearing against the face of the tenon 81 which is directed away from the ear 53, and therefore facing towards the reaction plate 1.

The ring 152 is held in position by the upset end of the expandable rivet 151. The head of the latter is shouldered and is in contact with the shouldered end 157 of the tube 153, while the main portion or shank of the rivet 151 passes through the tube 153.

The hole 156 in the ear 53, which in this example is narrower in the circumferential direction than the tenon 81, is oblong in shape, with parallel side edges extending radially and joined to each other through rounded base portions. The axis of symmetry of the hole 156 passes through the centre of rotation of the pressure plate 5, and the tube 153 is in point contact with the side edges of the holes 156. The pressure plate is thus centred with respect to the axis of the assembly, by virtue of the tube 153 cooperating with the contour of th hole 156, together with the tenon 81 which is centred by the axial lugs 32 (FIG. 3). The pressure plate 5 is butted against the intermediate disc 8, which enables the length of the lugs 32 to be reduced.

The tenons 81 are themselves in cooperation with the mortices 36 of the crown 3. Accordingly, the pressure plate 5 is movable axially with respect to the cover plate 2, while being coupled to the latter, for rotation with it, by means of the tenons 81 and tubes 153.

The intermediate disc 8 is made of a carbon based material, while the pressure plate 5 is for example made of aluminium. By virtue of the shouldered tube 153, the resilient means 154 and the hole 156, it becomes possible to absorb any differential thermal expansion or contraction that may arise due to differences in temperature between the intermediate disc 8 and the pressure plate 5.

The dimensions and stiffness of the resilient mean 154 are selected with a view to retaining the pressure plate against the intermediate disc 8, without a clearance between them, when the clutch is operating, while still enabling the Belleville ring or other resilient means 154 to yield axially in order to accomodate thermal movement of the pressure plate 5. The length of the shouldered tube 153 is also selected accordingly, in such a way that in its compressed position, the resilient means 154 will exert a sufficiently large thrust to hold the pressure plate 5 and the intermediate disc 8 together without a clearance between them.

This arrangement is of particular advantages in a sports or racing car or other high speed motor vehicle, because the clutch is able to reach high temperatures without any risk of undue deterioration of the friction discs, while at the same time the inertia is low. By virtue of the arrangement described above, the pressure plate 5 is resiliently butted against the intermediate disc 8, without any clearance appearing between them during the retraction of the intermediate disc 8 in the declutching operation. The Belleville ring 154 causes the pressure plate 5 and intermediate disc 8 to be gripped together resiliently. As mentioned above, it is dimensioned accordingly.

It will be noted that the pressure plate 5 has radial channels 52, which are open axially at the level of the intermediate disc 8 and in line with holes 26 (FIG. 3) formed in the skirt portion 22 of the cover plate 2. This provides a ventilation facility for the pressure plate 5, which enables the temperature of the diaphragm 4 to be reduced, so avoiding any undue deterioration in the resilient characteristics of the diaphragm under the effect of heat in operation.

It will also be noted that the radial web 111 of the hub 11 is perforated at 115, FIG. 4, thus reducing the weight of the hub 11 and improving the ventilation of the latter.

Figure 6:
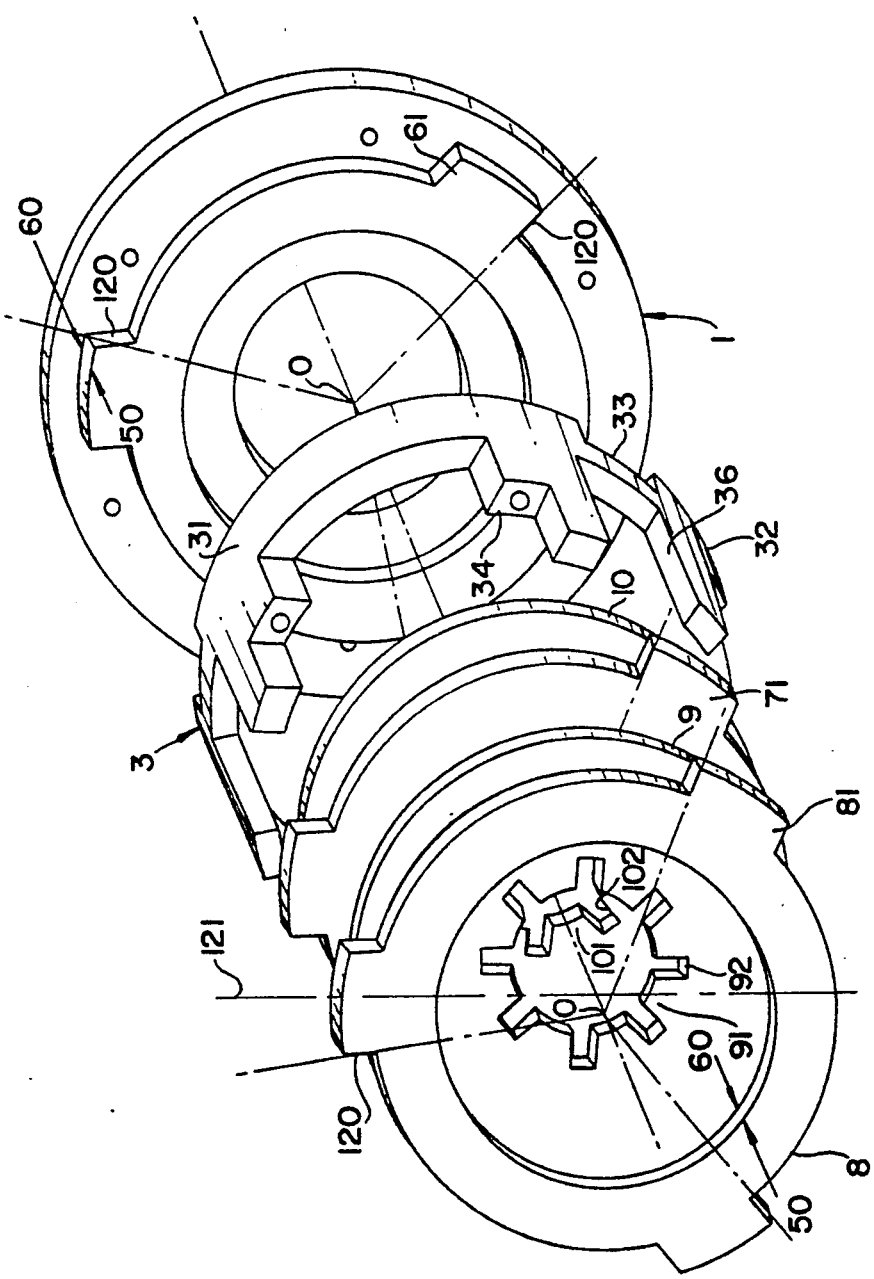
FIG. 6 is a simplified perspective view showing the intermediate discs, the friction discs, the intermediate crown and the reaction plate of the clutch in accordance with the invention.

As can be seen in FIG. 6, one of the sides, or lateral edges, 120 of the tenons 81, 71, 61 of the intermediate discs 8, 7, 6 respectively passes through the centre of rotation O of the intermediate disc concerned. In general terms, the axis of symmetry 121 of each tenon does not pass through the centre of rotation O of the corresponding intermediate disc. This is important because, in a clutch having two or more discs, their two sides 50 and 60 (see FIG. 6) will in certain cases not be interchangeable after the clutch has been refitted.

The arrangement described and shown thus ensures that, during refitting of the discs 6, 7 and 8, the latter cannot be refitted the wrong way round.

It will be recalled that in the normal position with the clutch engaged, the diaphragm 4 bears against the bead 24 and on the lip 51 (FIG.2), so that the pressure plate 5 is urged towards the reaction plate 1 so as to grip the intermediate discs 6, 7 and 8 and the friction discs 9 and 10 between the pressure and reaction plates. In order to disengage the clutch (i.e. to perform the declutching operation), it is merely necessary to apply a thrust by means of a clutch release bearing (not shown) on to the inner end of the fingers 42 of the diaphragm 4, so as to cause the diaphragm to tilt and overcome the axial thrust which the diaphragm exerts on the pressure plate 5.

It will be noted that during declutching, the friction discs 9 and 10 have sufficient degree of movement, that is to say a gap exists between the discs 6, 7 and 8 and the friction discs 9 and 10. This is due mainly to the retention of the disc 6 in the axial direction (as already described), together with the engagement of the intermediate disc 8 with the pressure plate 5 which is obtained by means of the fastening devices 15. The friction discs 9 and 10 are also able to slide freely due to their mounting on the hub 11, which is achieved with only simple machining.

It will be appreciated that the fitting of the clutch makes use of sub-assemblies. These are: the sub-assembly consisting of the reaction plate 1, intermediate disc 6 and intermediate crown 3; the sub-assembly consisting of the hub 11, the friction discs 9 and 10 and the intermediate disc 7; the sub-assembly consisting of the pressure plate 5 and intermediate disc 8; and finally a sub-assembly consisting of the cover plate 2 and diaphragm 4. After the crown 3 and intermediate disc 6 have been fitted, it is then only necessary to fit into the mortices 36 the sub-assembly plate 5 with its intermediate disc 8, and finally to fit the cover plate 2 with its diaphragm 4.

As will be clear from the foregoing description and from the drawings, the thickness of the closure ring 31 and the distance between the notches 33 and the base of the mortices 36 will be determined according to the application to which the clutch is to be put. In particular, it depends on the thickness of the friction disc 10, which (like the other friction disc 9) is thickened at its base to permit its sliding movement on the hub 11.

Similarly, it will be understood that the arrangements described above enable resilient means to be easily fitted, with these resilient means exerting a progressively increasing axial thrust so as to improve the comfort of the driver and to give good contact between the discs 6 to 10 and good ventilation of the pressure and reaction plates. Such resilient means may be associated with both the pressure plate 5 and with the reaction plate 1, and may be identical in shape. For example, and referring to FIGS. 9 to 13, they may each consist of a corrugated, resilient metallic ring 200, 300, having three radial lugs 201 on its outer periphery.

The body of the ring 200, 300 consists of circumferentially alternating radial portions 202, 203 joined together through oblique folds 205. In order to achieve standardisation of the rings 200, 300, each lug 201 has an oblong hole 204. Each hole 204 has two radial side edges which are joined together through rounded corners. These holes 204 are identical, in this example, to the holes 156 in the pressure plate 5.

The ring 200, 300 is both light in weight and thin. In this example there are three of the lugs 201 to each ring, with each lug 201 projecting from one of the radial portions 202, 203 of the ring. As shown in FIG. 13, the lugs 201 project from radial portions 203.

Thus the resilient ring 300 associated with the reaction plate 1 comprises lugs 201 which are arranged to cooperate in a mating manner with the notches 33 of the closure ring 31, so as to provide a coupling of the tenon and mortice type. In this case, the rounded stop surface 35 (FIG. 5) is not mandatory.

The lugs 201 are in contact with the tenons 61, and have a circumferential width substantially equal to the circumferential width separating the lateral flanks of the notches 33, with the depth of the latter depending on the thickness of the ring 300. The ring 300 is centered by means of the radial notches 33, by virtue of the lateral contact of the lugs 201 with the notches 33 and the fact that there are three of the latter. This ring 300 is interposed axially between the reaction plate 1 and its adjacent intermediate disc 6, with the radial portions 202 of the ring being in contact with the reaction plate 1, and its other radial portions 203 (some of which are extended by the lugs 201) in contact with the intermediate disc 6.

The other corrugated resilient metal ring 200 is associated with the pressure plate 5 and with its adjacent intermediate disc 8. The ring 200 is interposed axially between the plate 5 and disc 8, and is in contact with the latter through its radial portions 203 and lugs 201. The ring 200 is in contact with the pressure plate 5 through its radial portions 202. The lugs 201 are in contact with the tenons 81, are are traversed by the tubes 153, as can clearly be seen in FIG. 11. As shown in FIG. 12, the tubes 153 come into side contact with the holes 204, enabling thermal expansion and contraction to be accommodated.

The dimensions and stiffness of the resilient ring 154, which may for example be in the form of a Belleville ring, are of course preferably chosen so as not to compress the ring 200 fully in the declutched state and during declutching, while still enabling the ring 154 to yield axially in order to accommodate thermal movement of the pressure plate 5. Similarly, the ring 300, which is arranged to exert the same thrust, does not become fully compressed in the engaged position of the clutch.

During operation of the clutch, in order to obtain a progressive clutch engaging action, the rings 200 and 300 are thus compressed resiliently. The intermediate disc 6 becomes axially displaced, while remaining in contact with the notches 33.

The resilient rings 200 and 300 may of course be made of different stiffnesses, so as to exert different thrusts. In this way it is possible to arrange for the ring 300 associated with the reaction plate to become compressed first, or vice versa. Preferably, the rings 200 and 300 are not fully compressed: this enables good ventilation of the discs and of the pressure and reaction plates to be obtained, as well as good cooperation of the various surfaces involved.

The rings 200 and 300 may also be different as to the shapes of their lugs 201. The rings may also be flanged. Thus, the radial portions 203 and the lugs 201 may be in contact with either the reaction plate 1 or the pressure plate 5, and the radial portions 202 may be in contact with either one of the intermediate discs 6 and 8.

In a modification, only the reaction plate 1 has a resilient ring 200 or 300 associated with it, the pressure plate 5 not having a resilient ring associated with it; or vice versa. The profile of the ring 200 or 300 may be sinusoidal. The tenons 61 may be provided with dowels or bolts for centring the resilient ring 300. In that case, suitable apertures must be provided in the reaction plate.

The present invention is of course not limited to the embodiments described. In particular, the pressure plate may be driven directly in rotation by the intermediate crown 3, to drive the intermediate disc 8 in rotation. This arrangement thus involves a reversal of the structures as described above, with the pressure plate 5 centring the intermediate disc. The number of securing means or fastening devices 15 may be different from the number of tenons 81.

The intermediate disc 8 and the pressure plate 5 may both be driven by the intermediate member 3, in such a way that the tubes 153 are not necessarily centring tubes. Similarly, the driving of the intermediate discs may be obtained by means of a hollow member defining a cover, so that the intermediate member 3 is then no longer essential.

In a further modification, the intermediate disc may include supplementary tenons, which are distinct from the driving tenons 61 and which alternate with the latter. These supplementary tenons serve merely for ensuring that the intermediate disc is engaged with the pressure plate in the same manner as described above. Thus these supplementary, or coupling, tenons are not necessarily also drive tenons. In regard to the centring and spacing means, instead of the tube 153 described above it is possible to provide a shouldered cylindrical dowel, which is secured directly in the tenon 81 of the intermediate disc 8, for example adhesively. It is also possible, in another modification, to use a bolt which engages with the tenon 81 and which has a smooth shank portion for cooperating with the side flanks of the hole 156.

The centring means may of course not necessarily also have the function of a spacing means. In that case it is a separate element from the spacing tube or the like. In a further modification, a bolt having a smooth shank portion may be used for centring the pressure plate.

Instead of the member 3, a plurality of spacing blocks may be used. These spacing blocks are then fixed to the cover plate 2 and to the reaction plate 1 in the manner described in the specification of French published patent application No. FR2 623 862A. Between the intermediate discs that are closest to the reaction plate, these spacing blocks have circumferential extensions for cooperating with the appropriate intermediate disc in order to locate the latter axially. In that case, the thrust surface (e.g. the surface 35) is offset circumferentially with respect to the rotational driving means itself. Each circumferential extension or extensions mentioned above, associated with a respective one of the spacing blocks, may be provided with a notch similar to the notch 33 seen in FIG. 5. Similarly, the base of the notch 33 may constitute the thrust surface in accordance with the invention, with the relevant face of the tenon constituting the cooperating reaction surface.

The axial lugs 32 may comprise projections for cooperating with mortices formed in the discs 7 and 8. In a modification, these lugs comprise dowels or pins carried by the closure ring 31 and each engaging, with sliding movement, in a hole formed in a respective one of a series of lugs formed respectively on the disc 7 and the disc 8.

The clutch may have one friction disc, or more than two. The reaction plate may cooperate directly with one of the friction discs; in which case the clutch shown in FIG. 1 will only have two intermediate discs. The clutch may be of the "pull" type. The pressure plate may be coupled to the cover plate, for rotation with the latter, by means of tangential tongues, and may carry its intermediate disc. In that case, the axial lugs serve only for driving the disc 7.

Finally, the pressure plate may be subjected to the action of engagement means that comprise a component other than a diaphragm. This may for example consist of a hydraulic actuator device of the piston and cylinder type. Alternatively, it may consist of a plurality of coil springs with declutching levers.

What is claimed is:

1. A clutch comprising: a reaction plate; a cover plate secured to said reaction plate; a pressure plate; means mounting the pressure plate to the cover plate for rotation with the latter but for axial movement with respect to the cover plate; a hub mounted coaxially with said reaction and pressure plates; at least one friction disc secured to the hub for rotation therewith; at least one intermediate disc; and means mounting the at least one intermediate disc for axial movement with respect to the cover plate and for rotational movement with the reaction plate and cover plate, the at least one friction disc and the at least one intermediate disc being disposed between the pressure plate and the reaction plate with an associated intermediate disc, in contact with the pressure plate, wherein the clutch further comprises axial fastening means arranged between the pressure plate and its associated intermediate disc to exert a resilient gripping action thereon.

2. A clutch according to claim 1, wherein the axial fastening means are formed as a centering means.

3. A clutch according to claim 2, wherein the axial fastening means include at least a fastening device having a centering member carried by the intermediate disc associated with the pressure plate, the latter having an oblong hole formed therein and the centering member passing through the oblong hole.

4. A clutch according to claim 3, wherein the oblong hole defines an axis of symmetry extending through the center of rotation of the pressure plate.

5. A clutch according to claim 4, wherein the centering member is adapted to cooperate with lateral flanks of the oblong hole.

6. A clutch according to claim 3, wherein the centering member constitutes a spacing means and has a shoulder, the clutch further comprising axially acting resilient means interposed axially between said shoulder and the pressure plate, for engagement with said shoulder whereby to grip the pressure plate and its associated intermediate disc resiliently together.

7. A clutch according to claim 6, further comprising a tenon carried by said intermediate disc associated with the pressure plate, said centering member being carried by said tenon, the pressure plate having a radial ear and said oblong hole being formed in said ear.

8. A clutch according to claim 7, further comprising an intermediate driving crown member secured with respect to the reaction plate and a plurality of axial lugs carried by the intermediate driving crown member, with each said axial lug defining a mortice, said tenon of the intermediate disc associated with the pressure plate cooperating with one of said mortice.

9. A clutch according to claim 3, wherein said centering means comprise a centring tube, a tubular rivet having a head and extending through the centering tube, and a ring held by the head of the tubular rivet in contact with said intermediate disc associated therewith.

10. A clutch according to claim 1, wherein the cover plate is formed with a skirt portion having holes formed therein, the pressure plate having channels formed on its face adjacent to the intermediate disc associated with the pressure plate and being open in line with said holes in the skirt portion of the cover plate.

11. A clutch according to claim 3, further including axially and progressively acting resilient means interposed axially between the pressure plate and said intermediate disc associated with the pressure plate, said axially and progressively acting resilient means being mounted by said centering means whereby to obtain progressive engagement of the clutch.

12. A clutch according to claim 11, wherein said axially and progressively acting resilient means comprise a resilient, corrugated ring having radial lugs projecting from its outer periphery, for mating cooperation with said centering members, each said lug having a hole formed therethrough and each said centering member extending through a corresponding one of said holes in the lugs of the corrugated ring.

13. A clutch according to claim 12, wherein the corrugated ring comprises first radial portions and second radial portions alternating with the first radial portions, for contact with the pressure plate and the intermediate disc adjacent to the pressure plate, the corrugated ring further having oblique folds through which its said lugs are joined

* * * * *